Aug. 13, 1946.　　　　O. R. MILLER　　　　2,405,597
FREQUENCY MEASURING SYSTEM
Filed Nov. 5, 1942　　　　7 Sheets-Sheet 1

INVENTOR
O. R. MILLER
ATTORNEY

Aug. 13, 1946.   O. R. MILLER   2,405,597
FREQUENCY MEASURING SYSTEM
Filed Nov. 5, 1942   7 Sheets-Sheet 2

INVENTOR
O. R. MILLER
BY
ATTORNEY

FIG. 4

Aug. 13, 1946.  O. R. MILLER  2,405,597
FREQUENCY MEASURING SYSTEM
Filed Nov. 5, 1942  7 Sheets-Sheet 6

INVENTOR
O. R. MILLER
BY John Attall
ATTORNEY

Patented Aug. 13, 1946

2,405,597

UNITED STATES PATENT OFFICE 2,405,597

FREQUENCY MEASURING SYSTEM

Ohmer R. Miller, Morristown, N. J., assignor to Bell Telephone Laboratories, Incorporated, New York, N. Y., a corporation of New York Application November 5, 1942, Serial No. 464,664

4 Claims. (Cl. 175—368)

This invention relates to measuring systems and particularly to systems for the determination of the periodicity of regularly occurring phenomena such as the frequency of alternating current or the velocity of high speed rotating mechanism.

The object of the invention is to provide means for measuring with great accuracy the frequency of an alternating current or the periodicity of a train of electrical impulses.

Another object of the invention is to provide means for measuring with great accuracy the velocity of objects moving through space at a high rate of speed. Many such objects such as projectiles, aircraft and land vehicles rotate or have some moving part which rotates at a rate directly proportional to its forward movement. Due to the rifling of the barrel from which a projectile is fired it rotates at a rate depending on its speed. The propeller shaft of an airplane engine and the propeller shaft of a motor car rotate at a rate which is proportional to their speed through space. Any one of these devices may be fitted with a radio transmitter and a directional antenna so that if a radio receiver at an observation point is tuned to receive the wave transmitted by such transmitter the result can easily be translated by well-known means into an alternating current. The object then is to accurately measure the frequency of such alternating current.

In accordance with the present invention the alternating current is fed into an impulse generator which will translate such current into a train of sharply defined impulses. This train of impulses is then passed through an impulse counting device which counts a predetermined number thereof and marks the beginning and ending of such count by a start pulse and a stop pulse. Thus a period of time is noted which may be measured by comparing it with the output of a precision oscillator.

The next step is to operate a so-called "gate" by the start and stop pulses generated by the impulse counting device. This gate will then admit to another pulse counting device the output of a precision oscillator for the exact period of time measured whereby the number of pulses then counted will bear a direct relation to the time and thereby give an accurate measure thereof.

The impulse counting chain for counting the number of cycles of alternating current admitted thereto through the said gate from the precision oscillator may be connected to a suitable translating and indicating means so that a direct reading may be had.

In order to promote accuracy, the admission of the train of regularly recurring impulses to the first counting chain is delayed for a predetermined interval. This is especially important where the train of impulses is applied in a manner where the impulses are at first very feeble and then gradually rise to full strength. This time delay, therefore, allows the impulses to grow to full strength before being applied to the counting chain. Again it is practically impossible for a person to close a circuit accurately at a given point in the train of impulses so that this method avoids a first impulse which might otherwise be mutilated.

Again, and for the same purpose, when the impulses are admitted to the counting chain a predetermined number are allowed to operate the chain but are not counted. In other words a predetermined number of impulses are absorbed before the actual count is started. This insures that the counting will always be started at the same point in the cycle so that no undetermined partial cycles are counted.

A feature of the invention is a means for counting a predetermined number of cycles of the unknown frequency or a predetermined number of impulses of unknown periodicity, means responsive thereto for generating and transmitting a start and a stop pulse at the beginning and ending of the counting operation and means for counting the number of cycles of alternating current from a precision source between said start and stop pulses.

Another feature of the invention is a method of measuring the frequency of an alternating current or the periodicity of a train of regularly recurring impulses which consists of counting a predetermined number of such alternations or such impulses, marking the beginning and the ending of the counting operation and then counting the number of cycles of alternating current from a source of known accuracy which occur between the said beginning and ending of the first counting operation. The last count will then bear a direct relation to the frequency of the alternating current or the periodicity of the train of impulses to be measurer.

Still another feature of the invention is a method of measuring the periodicity of a train of regularly recurring electrical impulses which consists of counting a predetermined number thereof and comparing the time taken to make such a count with the rate of a current of known frequency characterized by steps taken to insure the accuracy of such count consisting of delaying the application of the unknown periodic current to the counting means for a predetermined time after the beginning of the operation and then absorbing without counting a predetermined number of such impulses after the unknown periodic current is applied to the counting means.

Other features will appear hereinafter.

The drawings consist of seven sheets having eleven figures, as follows.

Figure 1:
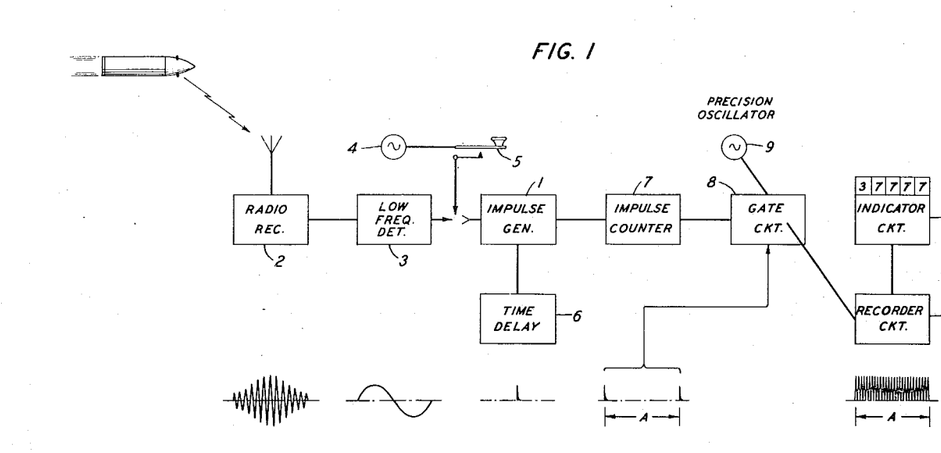
Fig. 1 is a schematic circuit diagram showing the relation of the various circuit units to explain the general method of operation.
Figure 2:
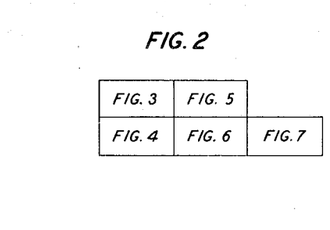
Fig. 2 is a block diagram showing how Figures 3 to 7, inclusive may be placed to make a complete detailed circuit diagram.

In Fig. 1 the invention is illustrated schematically. The working starts where an alternating current is fed into the impulse generator 1. As shown, this alternating current may be derived from a projectile equipped with a radio transmitter having a directional antenna in the fuse portion thereof. The radiations of such a transmitter are picked up by the radio receiver 2 in the form of oscillations periodically varying in amplitude as illustrated by the graph below the radio receiver 2. The variations in amplitude are caused by the rotation of the projectile in flight due to the rifling of known pitch of the barrel from which it has been discharged. The frequency of such variations in amplitude bear a direct relation to the velocity of such projectile in flight. The output of the radio receiver 2 is passed through a low frequency detector 3 and produces therein an alternating current all in accordance with well-known means and methods.

Or the alternating current which is fed into the impulse generator 1 may be derived from any other source, such, for instance, as the source of alternating current 4 and applied to the impulse generator by any means such as the key 5.

Now upon the application of an alternating current to the impulse generator 1, a time delay circuit 6 starts into operation and delays for a given interval of time the application of the output of the impulse generator to the impulse counter 7. This is to insure that the first impulses to be counted are of full strength.

The impulse generator 1 is a device which produces a single sharply defined impulse from each cycle of alternating current fed thereinto. Through novel means provided this single sharply defined pulse may be made to occur at any particular point in the cycle over a given range as for instance, just as the wave passes through zero from the positive half wave to the negative half wave.

The train of impulses now flowing into the impulse counter 7 starts this device into operation with the result that two pulses are produced thereby, one constituting a start pulse at the beginning of a count and the other constituting a stop pulse at the end of an operation during which a predetermined number of pulses are counted. Thus an interval of time A is measured between the start and stop impulses which is the time taken for a given number of rotations of the projectile or a given number of cycles of the alternating current from the source 4.

As will appear hereinafter, and for certain reasons having to do with the question of extreme accuracy, several pulses incoming to the impulse counter 7 at the beginning of the operation are absorbed and not counted.

The start and stop pulses produced by the impulse counter 7 are employed to operate the gate circuit 8. This is a device effectively interposed between a precision oscillator 9 and a recording circuit 10. The recording circuit 10 will accurately count the cycles of alternating current flowing through the gate circuit 8 during the interval A, the gate being opened by the said start impulse and being closed by the said stop impulse. Since the precision osillator 9 may produce a current of precisely regulated frequency and of a comparatively high frequency the interval of time A may be measured with extreme accuracy. In general, the recording circuit 10 is of the same nature as the impulse counter 7, as will be more fully set forth hereinafter.

The impulse counting circuit 10 operates an indicating circuit 11 which serves to give some kind of an indication revealing the number of impulses counted during the time A while the gate 8 was open. In accordance with one embodiment of the invention this indicator consists of means to display a number such as 37,777. The frequency of the source 9 being known, the number 37,777 is then a direct measure of the time interval A and therefore in direct proportion to the velocity of the projectile or to the frequency of the source 4.

Considering now the detailed circuit drawings, several general observations may be made. Throughout the drawings wherever ionic tubes are shown the filaments for heating such tubes are indicated but the battery supply is not shown since the manner of making such connections is well known and the addition of such circuits would unnecessarily complicate the drawings. In various figures there are shown reset keys whose function it is to return the various circuits to their normal conditions. It will be understood that these may be in the form of separate keys as shown and described or they may all be incorporated in a single device so that at one stroke the various circuits may be properly controlled.

Figure 3:
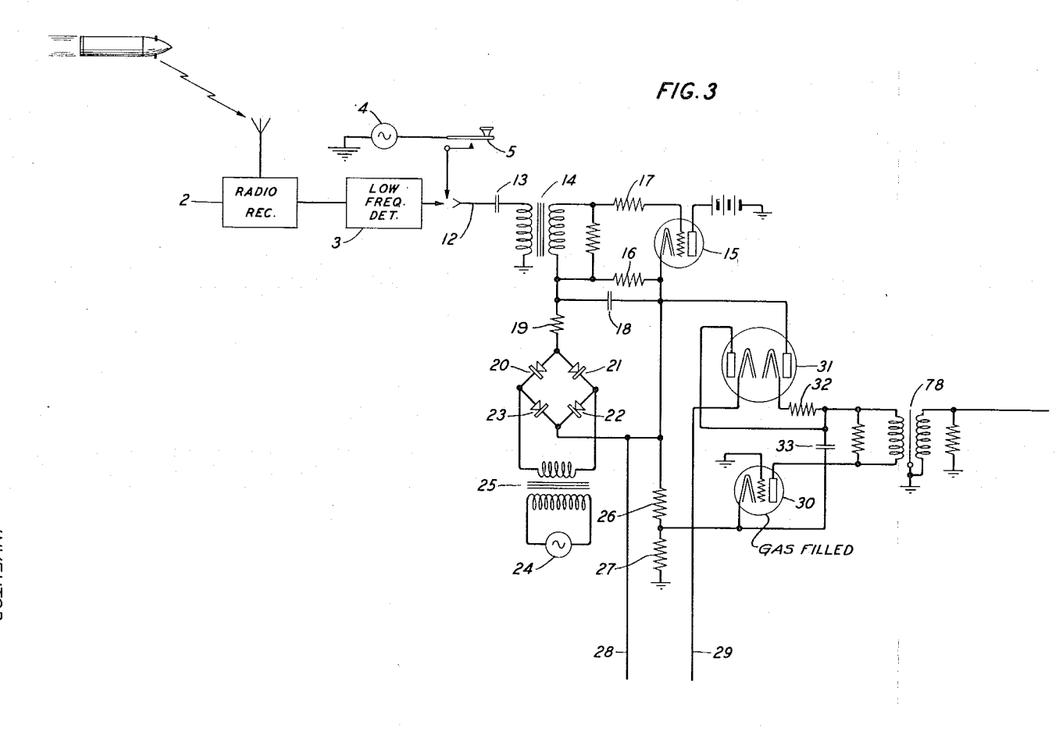
Fig. 3 is a circuit diagram of the impulse generator.

As explained hereinbefore, an alternating current is fed into the impulse generator from one or another source such as the radio receiver 2 and low frequency detector 3 or the source 4 through some connecting agency such as the key 5. In the impulse generator the alternating current flows in over conductor 12, through condenser 13 and thence through the primary winding of a transformer 14 to ground, it being assumed that a ground connection is provided at the said source of current. The secondary winding of transformer 14 thus becomes a source of alternating current to affect the triode 15.

The cathode grid circuit of this tube may be traced from the cathode through the resistance 16, the secondary winding of the transformer 14, resistance 17 to the grid of tube 15. A condenser 18 is in parallel with both the resistance 16 and a source of negative biasing battery comprising the resistance 19 and the well-known network of rectifiers 20, 21, 22 and 23, energized by a source of alternating current 24 and an interposed transformer 25. The potential supplied by this network controls the anode-cathode current flow in the tube 15 between the battery connected to the anode thereof and the resistances 26 and 27 to ground. Under these conditions a given potential thus stands on the cathode of tube 15, this being a point on the potentiometer consisting of the internal resistance of the tube and the two resistances 26 and 27.

Now as an alternating current wave in the secondary winding of transformer 14 rises from a zero value to an increasing positive potential the grid of the tube becomes less negative and as a consequence the anode-cathode current increases. Therefore, the potential of the cathode with respect to ground increases, so that the potential on the start conductor 28 increases. This start conductor leads into the time-delay circuit so that when the increase of potential thereon is great enough the time-delay circuit will be tripped off and in a given time will raise the potential on the control lead 29 sufficiently to allow the gas tube 30 to function.

Normally the cathode of the tube 15 is connected in a circuit with the right-hand pair of elements of the double diode tube 31, resistance 32, condenser 33, resistance 27 to ground, whereby the condenser 33 may be charged as the potential of the cathode of tube 15 rises. Normally also the potential standing on the control conductor 29 and communicated through the lefthand pair of elements of the double diode 31 directly to the condenser 33 prevents the aforementioned charging circuit from becoming effective. In other words, the control conductor normally holds the voltage on the condenser 33 down so that the impulse generator cannot function.

If the alternating current fed into the input conductor 12 is derived from the radio receiver 2 the signals may at first be weak but as they grow in strength a point will be reached where the rise of potential on the cathode of tube 15 and on start conductor 28 is sufficient to trip off the time-delay circuit. Thereafter, and after a predetermined time the potential on the control conductor 29 will be raised to enable the impulse generator to operate as will be described hereinafter.

Figure 8:
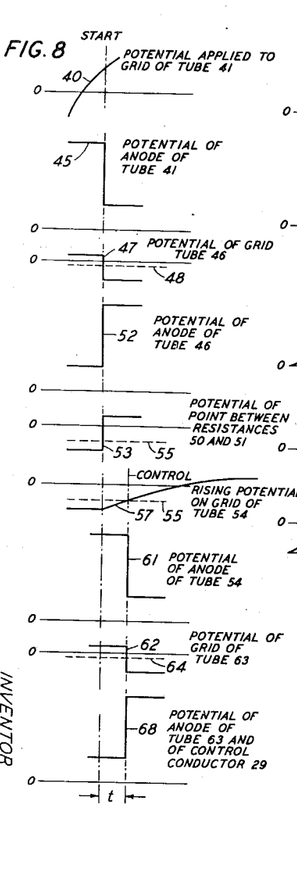
Fig. 8 is a nest of graphs useful in explaining the operation of the time-delay circuit of Fig. 4.

The operation of the time-delay circuit of Fig. 4 will be explained with the help of a nest of graphs shown in Fig. 8. Two vertical lines are shown, one marked "start" and the other marked "control." The distance between these lines is a measure of the time interval desired.

The start conductor 28 is connected through a resistance 34 to an intermediate point on a potentiometer comprising resistances 35, 36 and 37 connected between positive battery 38 and negative battery 39. As the potential on the conductor 28 rises according to the graph 40 it reaches a point where the gas tube 41 triggers off and this is the start of the operation. Tube 41 becomes conducting and the anode-cathode current flow therethrough changes the potential at the potentiometer point between resistances 42 and 43 as indicated by the graph 45 from a comparatively high positive potential to a comparatively low positive potential. At the same time the potential on the grid of tube 46 falls, as indicated by graph 47, from a positive value to a negative value below the cut-off bias (indicated by the dotted line 48) of the triode 46 so that this tube now becomes non-conducting. This changes the potential of the potentiometer point between the resistances 49 and 50, as indicated by graph 52, from a comparatively low positive value to a comparatively high positive value. Thereupon the potentiometer point between resistances 50 and 51 rises, as indicated by graph 53, from a negative value through the trigger potential of gas tube 54 (indicated by the dotted line 55) to a positive value. Thereupon the condenser 147 begins to charge through resistance 56 in accordance with graph 57, and when the trigger potential 55 of the tube 54 is reached the control conductor 29 is effected, as follows. When tube 54 becomes conducting the potentiometer point between the resistances 58 and 59 changes its potential, as indicated by graph 61, from a comparatively high positive value to a comparatively low positive value. Thereupon the potentiometer point between resistances 59 and 60 drops, according to graph 62, from a positive value through the cut-off bias grid potential of tube 63 (indicated by the dotted line 64) to a negative value and tube 63 becomes non-conducting. This in turn changes the potential on the potentiometer point between resistances 65 and 66, as indicated by graph 68, from a comparatively low positive value to a comparatively high positive value. This last potential change is communicated over control conductor 29 to enable the impulse generator.

Figure 4:
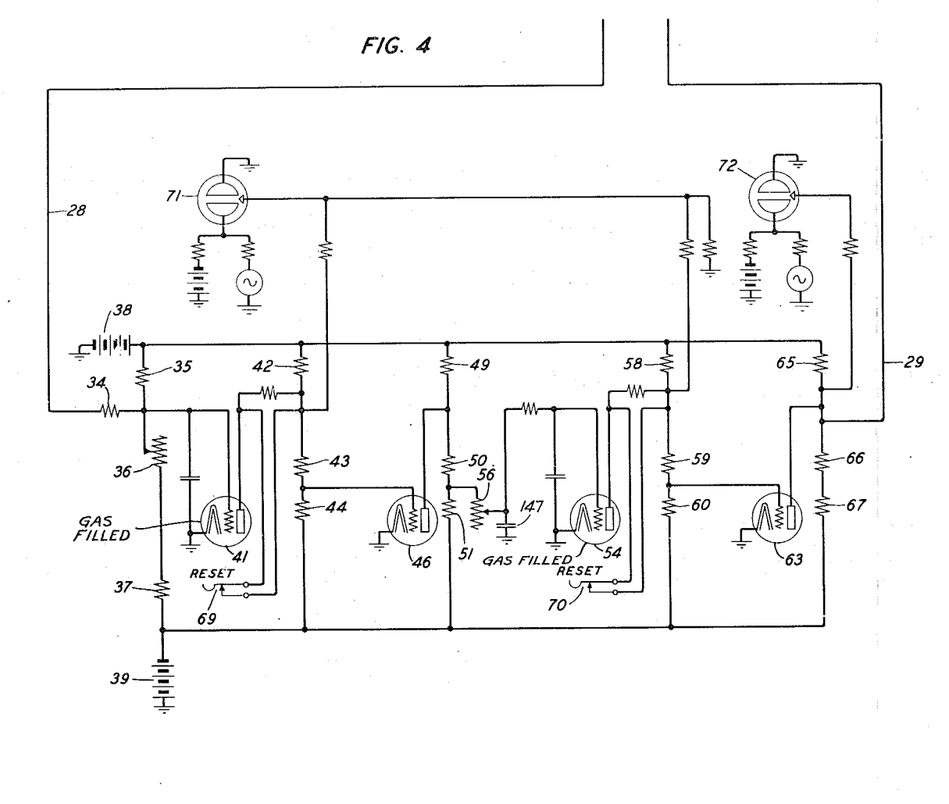
Fig. 4 is a circuit diagram of the time-delay circuit.

The tubes of Fig. 4 will now remain in the condition just described regardless of the variation in potential on the start conductor 28 until the reset keys 69 and 70 are operated to render tubes 41 and 54 again non-conducting.

A pair of cold gas signal tubes 71 and 72 are provided for visually indicating the operation of this time-delay circuit. Tube 71 whose control anode (indicated by the arrowhead) is normally at a comparatively high positive potential is therefore normally glowing. When this potential is dropped in accordance with graph 45 this tube becomes dark as an indication that the timing operation has started. Tube 72 whose control anode is normally at a comparatively low positive potential is normally dark. When this potential is raised in accordance with graph 68 to a comparatively high positive potential this tube 72 glows. The period of time during which both signals are simultaneously dark is a measure of the desired time interval. This may be adjusted as desired by changing the value of the resistance 56 and the capacity of the condenser 147.

In this manner, then, the signals being fed into the impulse generator over conductor 12 grow in strength, and the impulse generator is enabled a predetermined time after such signals have reached a strength sufficient to trigger off the tube 41.

With the rise of potential on control conductor 29 the impulse generator will function. This will be explained with the help of Figures 9 and 10.

Figure 10:
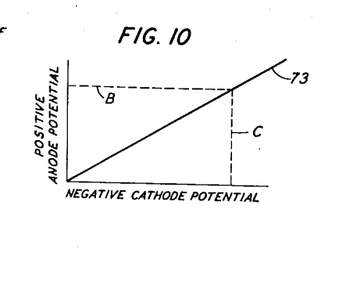
Fig. 10 is a characteristic curve of the gas tube which produces the impulses in the impulse generator of Fig. 3.

Tube 30 is a gas tube, one of whose characteristics is depicted in Fig. 10. For each given positive potential value on the anode thereof there is a corresponding given negative value on the cathode at which the tube will fire or trigger off.

This is shown by the curve 73 plotted between positive anode potentials and negative cathode potentials. In accordance with this invention a positive anode potential is first established and thereafter the negative potential is increased (in a positive direction) until the corresponding point is reached, whereupon the tube fires.

Figure 9:
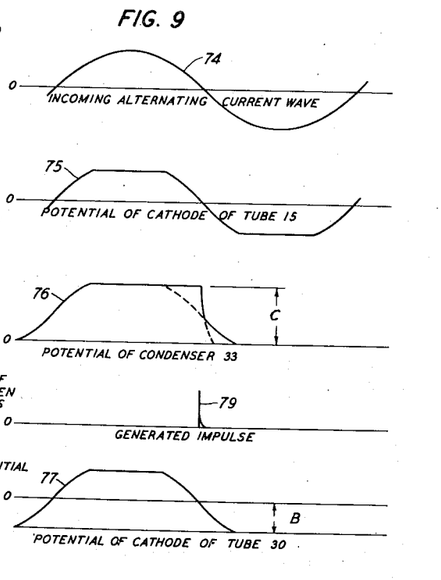
Fig. 9 is a nest of graphs useful in explaining the operation of the impulse generator of Fig. 3.

In Fig. 9 the graph 74 represents a cycle of alternating current as delivered by the secondary of transformer 14. As the positive half wave rises in value, the negative potential on the grid of tube 15 recedes until the tube becomes saturated and hence the change of potential on the cathode thereof rises to a particular value and then halts as indicated by the graph 75. This is a measure of the potential being applied through the right-hand elements of the double diode 31 to the condenser 33. Thus the charge on condenser 33 rises, in accordance with graph 76, during the rising part of the positive half wave of alternating current potential 74. However, due to the unidirectional characteristics of the diode 31 the positive charge C attained on the condenser 33 is maintained as the falling part of the positive half wave is reached. But at this time the cathode potential of tube 30 measured at the potentiometer point between resistances 26 and 27 begins to fall, in accordance with graph 77, until the negative value B is reached. Since the positive potential C of condenser 33 is now placed through the primary winding of transformer 78 on to the anode of tube 30, this tube will fire and the condenser 33 will discharge through the anode-cathode circuit of tube 30 and the primary of transformer 78.

In the above description the negative value B of the cathode of tube 30 is described. Actually the cathode of tube 30 is never at a value negative with respect to ground but if the actual potential of this cathode at the static condition of the circuit when the incoming alternating current wave is at zero is taken as a reference point, then the cathode of tube 30 moves in a negative direction so that when the potential of the cathode of this tube is spoken of as becoming negative it will be understood that it is increasing in a negative sense. Thus as the current in resistance 27 decreases the potential of the cathode of tube 30 increases in a negative sense.

Thus the difference of potential between the terminals of condenser 33 increases both during the rising value of the incoming half wave of alternating current and the following decreasing value of this half wave until the tube 30 is triggered off.

This action will continue as long as the potential of conductor 29 is maintained at a comparatively high value by the tube 63 whereby the charge on condenser 33 is prevented from being dissipated over the path including conductor 29 and tube 63, as it is during the inactive periods of the impulse generator of Fig. 3.

It is to be noted that the value of the negative bias of tube 15 may be regulated so that the value of the positive potential attained on the anode of tube 30 may be adjusted as desired. This may particularly be adjusted so that this positive potential attained or established on condenser 33 may just match the negative potential attained on the cathode of tube 30 as the alternating current wave 74 passes through zero from the positive half wave to the negative half wave. Thus the discharge of the condenser 33 may be made to occur at any desired point.

The discharge of condenser 33 through the primary of the transformer 78 produces a single sharply defined pulse shown by graph 79, which may be inverted by the transformer 78 to a negative pulse. This is transmitted over the signaling conductor to the impulse counter of Fig. 5.

Thus alternating current incoming over conductor 12 is transformed into a train of sharply defined unidirectional pulses, one for each complete cycle of alternating current. These pulses are then applied to the output circuit of the impulse generator which is connected to the input circuit of the impulse counter.

Figure 5:
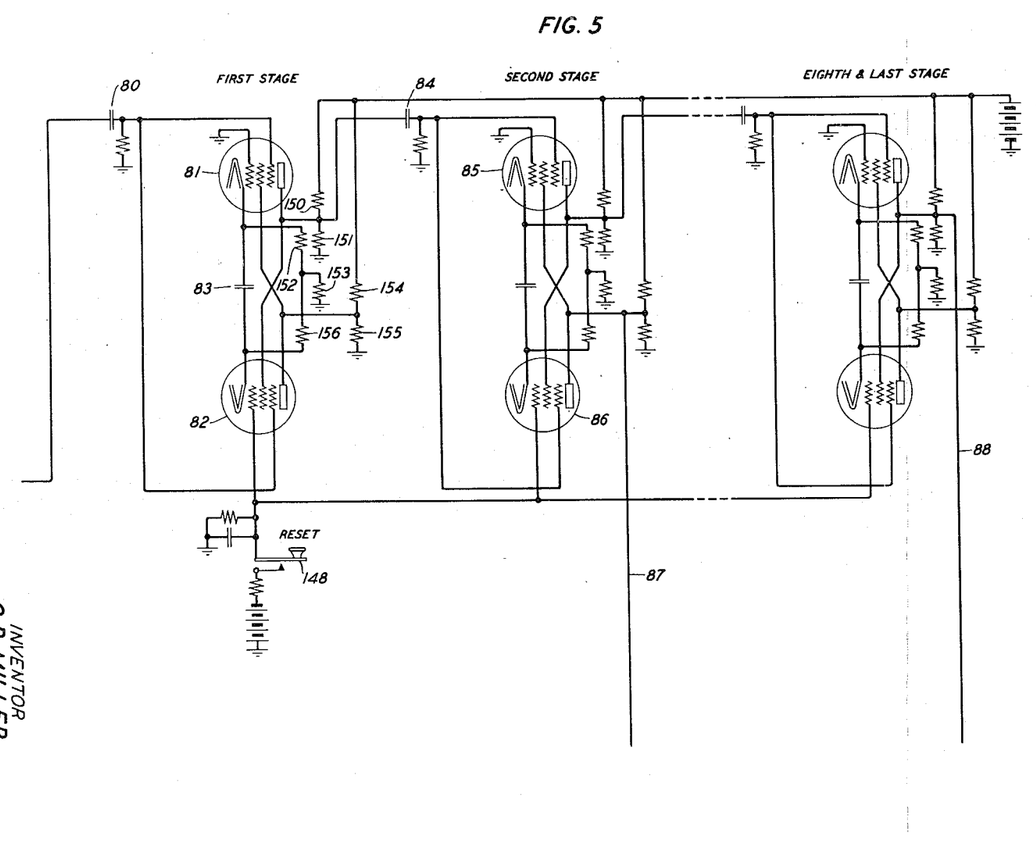
Fig. 5 is a circuit diagram of a pulse counter for producing the start and stop pulses for operating the gate circuit.

The pulses coming in over the input conductor pass through condenser 80 and appear as sharply defined negative pulses leading to the suppressor grids of two tubes 81 and 82.

The tubes 81 and 82 form a counting pair, one of which is always energized and in a conducting state. The principle of operation is fundamentally the same as that of the well-known Eccles and Jordan circuit, disclosed in British Patent 148,582. These tubes are, however, pentodes with the anode of each connected to the screen grid of the other. When the negative impulse is applied to the suppressor grid of both, then both are rendered non-conducting. When the said negative impulse has ceased the combination of the two tubes is left in an extremely unstable state so that the slightest influence will determine which of the two is to become conducting to the exclusion of the other. This extremely slight influence is supplied by a condenser 83 connected between the cathodes of the two tubes which is charged in one direction while tube 81 is active and in the other direction while tube 82 is active. When the negative impulse is applied to the two suppressor grids, condenser 83 becomes discharged but there is left a slight residual charge, the magnitude of which depends on the effective length of the said negative pulse. At the termination of this negative pulse the said slight residual charge on condenser 83 is sufficient to determine which of the two tubes will then become active. If tube 81 has been active before the negative pulse, then tube 82 will become active thereafter. Thus one negative pulse will render tube 81 inactive and tube 82 active and a second pulse will reverse this condition and render tube 82 inactive and tube 81 active.

Throughout the circuits to be described a large number of these counting pairs are employed all of which operate in the same manner. The detailed description of the operation of a single pair will therefore be sufficient. It will be found that the upper tube of each pair is normally active; that is, it is in a conducting state and has a low potential on its anode. Conversely the lower tube of the pair is normally inactive; that is, it is in a non-conducting state and has a high potential on its anode.

It will be noted that the anode of each tube is in a potentiometer circuit. For tube 81 this potentiometer circuit may be traced from a high positive battery through resistance 150 and resistance 151 to ground. The anode of the tube 81 is connected to the potentiometer point between resistances 150 and 151. Also a circuit constituting a potentiometer may be traced from resistance 150, the anode cathode path within the tube, resistance 152 and resistance 153 to ground. The resistances of the tube 152 and 153 are thus in parallel with resistance 151. Now when the tube is non-conducting or inactive there being little if any current flow in this potentiometer circuit, the potential of the anode (and the screen grid of the companion tube) is at a comparatively high positive value. Thus the tube 82 is enabled by a comparatively high positive screen grid potential. However, when a negative potential is applied to both suppressor grids both tubes become non-conducting and hence a comparatively high positive potential is applied to the screen grid of each. Hence, when the negative potential is removed from the suppressor grids both tubes are in a condition to become active or conducting. The choice of which one prevails rests with the condenser 83 as hereinbefore pointed out.

When tube 81 is in an active or conducting state the current flow in its anode-cathode circuit affects the potentiometer point between the resistances 150 and 151 so that the potential thereof is at a comparatively low positive value. Hence the screen grid of the companion tube is at a comparatively low positive value and this tube is held in a non-conduction or inactive state.

The potentiometer circuit for tube 81 has been described. Tube 82 has a similar potentiometer circuit consisting of the resistances 154, 155, 156 and 153.

It should be noted that as a tube goes from a non-conducting to a conducting state its potentiometer point suddenly drops from a comparatively high to a comparatively low positive value. Hence as tube 81 becomes active the potentiometer point between resistances 150 and 151 drops and condenser 84 translates this sudden drop in potential into a negative impulse to be applied to the suppressor grids of tubes 85 and 86.

Thus the pair of tubes 81 and 82 provide a means which sets up a stable condition which will remain fixed, but which instantly responds to a negative incoming pulse to reverse the previous condition of the two tubes. Also the tubes in their reversal will generate a like negative pulse when the reversal in condition is in a given direction so that for every two incoming negative pulses a single outgoing negative pulse is generated.

The impulse counter consists of a plurality of pairs arranged to count the impulses according to a binary geometric progression system. Thus, the first pulse renders tube 82 active. The second pulse rendering tube 81 again active will also generate a negative pulse through condenser 84 to the pair of tubes 85 and 86 and will result in rendering tubes 82 and 85 inactive and tubes 81 and 86 active. The third pulse will render tube 81 inactive and tube 82 active.

It may be noted that if each of the lower tubes of all pairs is given a value of zero and each of the upper tubes is given a value according to a geometric progression as 1, 2, 4, 8, 16, 32, 64, 128, 256, etc., the sum of the values of the inactive tubes will be a count of the number of pulses. Thus, at the beginning all the inactive tubes will have a value of zero and the sum of such values will be zero. After the first pulse, tube 81 will be inactive and the sum now becomes 1. After the second pulse tube 85 is inactive and tube 81 is active so that the sum becomes 2. After the third pulse tubes 81 and 85 are inactive so that the sum becomes 1+2=3. With two pairs of tubes three pulses may be counted as the next or fourth pulse will return both pairs of tubes to normal while passing such fourth pulse on the next pair of tubes to be counted there. With eight stages two hundred and fifty-five pulses may be counted, all pairs being returned to normal on the two hundred and fifty-sixth pulse with such pulse being passed on to the following pair or stage.

Thus in the impulse counter of Fig. 5 eight stages of these counting pairs of tubes are provided. The first pulse renders tube 81 inactive; the second pulse renders tube 85 inactive and tube 86 active. As tube 86 passes from the inactive to the active stage a negative pulse is generated and passed over conductor 87 where it functions as a start signal to the gate circuit of Fig. 6. The two hundred and fifty-sixth pulse returns all the upper inactive tubes to normal and generates a negative pulse which now passes over conductor 88 where it functions as a stop signal to the gate circuit. Thus the difference between two hundred and fifty-six and two or two hundred and fifty-four pulses is counted, the first two being effectively absorbed. The gate circuit thus opens a circuit for the flow of alternating current from a precision oscillator for the length of time of two hundred and fifty-four pulse cycles from the impulse generator. The impulse counter may be arranged to count any other number which would be more suitable under the circumstances under which this apparatus may be used.

The purpose of absorbing one or more pulses at the beginning of the train is to insure the measurement of a definite time interval and avoid error which might come from a false start if the first impulse transmitted from the impulse generator were not of full strength.

The reset key 148, when operated, will return the impulse counter to normal by rendering all the lower tubes of the various stages inactive.

Figure 11:
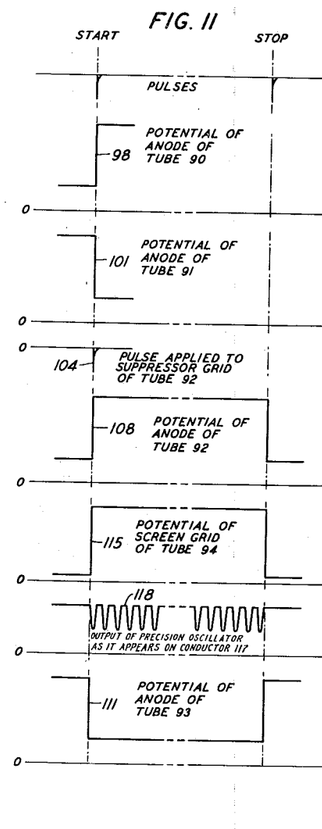
Fig. 11 is a nest of graphs useful in explaining the operation of the gate circuit of Fig. 6.

The action of the gate circuit, Fig. 6, will be explained with the help of a set of graphs, Fig. 11. Here a number of tubes are employed some of which are paired as in the pulse counter. For instance, tubes 90 and 91 form one pair and tubes 92 and 93 form another pair. Tubes 90 and 92 are normally active and tubes 91, 93 and 94 are normally inactive. The connections of the tubes are much as before except that the condenser between the cathodes of the tubes of a pair is not employed so that a negative pulse coming in over the start conductor 87 and passing through the condenser 89 will reverse the condition of the tubes 90 and 91, rendering tube 90 inactive and the tube 91 active. A potentiometer is formed between the positive battery 95, resistance 96 and resistance 97 to ground, and the anode of tube 90 and the grid of tube 91 are connected to this potentiometer at a point between resistances 96 and 97. Due to the current flow while tube 90 is active the potential of this point is held at a comparatively low positive value. When the negative start pulse comes in over conductor 87 to the suppressor grid of tube 90 this tube becomes non-conducting with the consequence that the potential of the anode in the said potentiometer circuit rises to a comparatively high positive value, as indicated by graph 98 (Fig. 11). Since this comparatively high positive potential also appears on the grid of tube 91, this latter tube now becomes conducting. Here again a potentiometer is formed of positive battery 95, resistance 99 and resistance 100 to ground. The potential on the potentiometer point between resistances 99 and 100 is normally a comparatively high positive potential but as tube 91 becomes conducting this drops to a comparatively low positive potential as indicated by graph 101. This being communicated to the grid of tube 90 holds this tube non-conducting after the termination of the negative start pulse.

As the potential of the anode of tube 91 drops, the condenser 102 responds by discharging between resistances 103 and 100, forming a negative pulse, graph 104, applied to the suppressor grid of tube 92. Tube 92, normally conducting, now becomes non-conducting with the result that the potentiometer point between resistances 106 and 107 rises from a comparatively low positive value to a comparatively high positive value, as indicated by graph 108. This causes tube 93 to become conducting so that the potential on the potentiometer point between resistances 109 and 110 now drops from a comparatively high positive value to a comparatively low positive value, as indicated by graph 111. This drop of potential communicated to the grid of tube 92 holds this tube non-conducting after the termination of the negative impulse from condenser 102.

Another potentiometer is formed between positive battery 95, resistances 106, 112 and 113 to negative battery 114. The potential of the point between resistances 112 and 113 in general follows the potential of the point between resistances 106 and 107, as indicated by graph 115, and hence as this point rises in potential the tube 94 is rendered active so that pulses from the precision oscillator connected to input lead 116 may be passed through the tube 94 to the output lead 117 as a train of negative pulses, as indicated by the graph 118.

The output of the precision oscillator is practically a sine wave. It is, however, connected through a condenser 119 and a resistance 120 to a potentiometer point between resistance 121 leading to positive battery and resistance 122 leading to negative battery, whereby the tube 94 is biased to cut-off so that only the peaks of the positive half waves affect the tube to produce at its anode and on conductor 117 a series of negative pulses. Before the start pulse has rendered the tube 92 non-conducting the screen grid of tube 94 is held down to a comparatively low positive potential (graph 115) so that the tube 94 is blocked. When, upon the occurrence of the start pulse, the potential of this screen grid rises to a comparatively high positive potential this tube becomes unblocked and the distorted wave from the precision oscillator passes to the output 117 as a train of negative pulses. The conditions thus far described hold until the stop pulse is received over conductor 88.

When the stop pulse is transmitted over conductor 88 it passes through condenser 123 and appears as a negative pulse on the suppressor grid of tube 93, whereupon the condition of the two tubes 92 and 93 will become reversed, 92 becoming conducting and 93 becoming non-conducting. It will be seen from graphs 108, 111, 115 and 118 that the flow of negative pulses over the output circuit 117 is thus abruptly terminated.

The circuit will remain in the present condition, with tubes 91 and 92 active and tubes 90, 93 and 94 inactive until the circuit is returned to normal condition by the operation of the reset key 124, which, by temporarily placing negative potential on the control grids of tubes 91 and 93 insures that tubes 90 and 92 become active and tubes 91, 93 and 94 become inactive.

As in the case of the time-delay circuit described hereinbefore, this circuit unit is provided with a pair of glow tubes to indicate the condition of the apparatus. Tube 125 is normally active, and becomes dark as soon as the start pulse is received and remains dark thereafter. Tube 126 is normally dark and remains dark until the stop pulse is received whereupon it glows. The interval during which both tubes are dark is therefore a measure of the time interval between the start and stop pulses.

The control electrode of tube 125, indicated by the arrowhead, is connected to a potentiometer point leading through resistance 127 to ground. The potential of this point is controlled by tube 91 over resistance 128 and by tube 93 over resistance 129. When either of these tubes is active the tube 125 is held inactive but when both these tubes 91 and 93 are inactive, as under normal conditions, then the potential of the point between resistances 99 and 100 and the potential of the point between resistances 109 and 110 is at a comparatively high positive value and tube 125 as a consequence, glows.

Likewise, tube 126 is under control of tubes 90 and 93 so that only after the gate circuit has completely functioned and tubes 90 and 93 are simultaneously inactive is tube 126 conditioned to glow. Thus tube 125 glowing indicates that the gate circuit has not yet functioned and tube 126 glowing indicates that the gate circuit has completely functioned.

Figure 7:
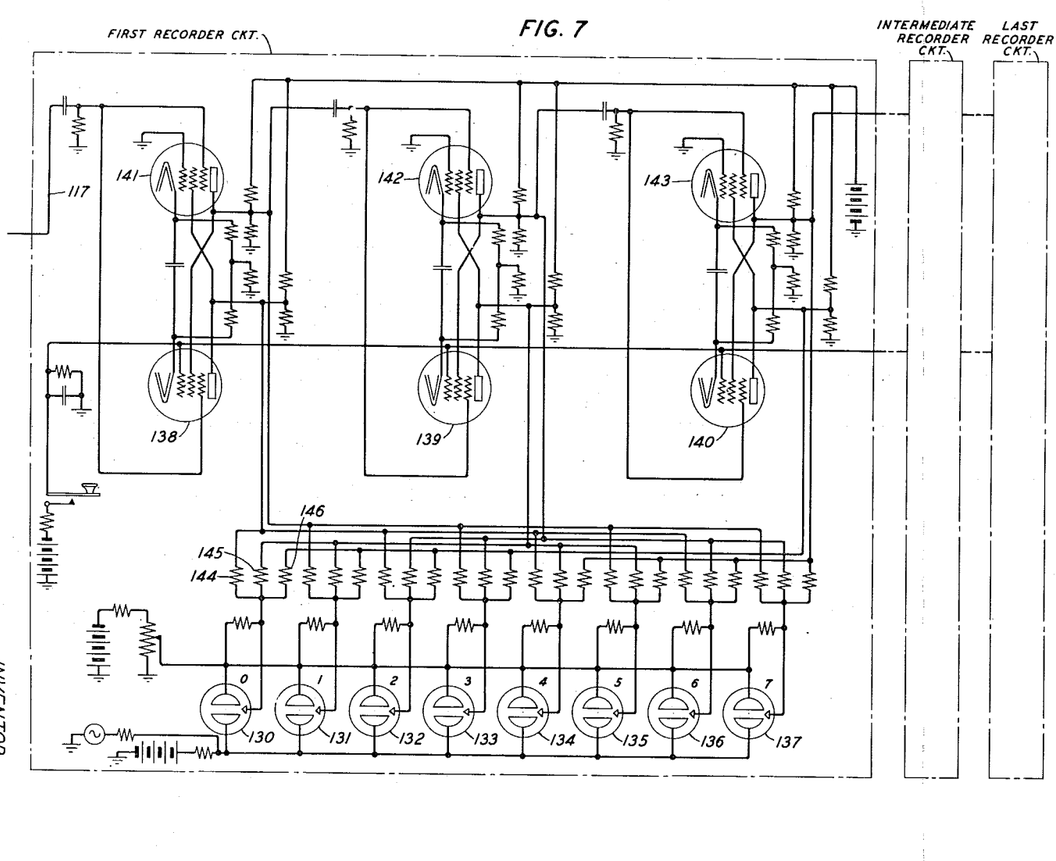
Fig. 7 is a diagram of the pulse counting and recording means, showing one unit thereof in full and indicating duplicate units schematically.

The train of negative pulses transmitted over conductor 117 feed into a chain of pulse counters in Fig. 7 represented by the recorder circuit 10 of Fig. 1 similar to those shown in Fig. 5. In order to count a number of pulses of the order of 16,000 it would be necessary to provide about fifteen pairs of tubes. As pointed out hereinbefore, with fourteen pairs of tubes and after a counting operation in which the upper or normally conducting tube of each pair has been rendered non-conducting a number 11, 111, 111, 111, 111 in accordance with the simple binary geometric progression scheme of counting would be recorded. This number, translated into the commonly used decimal system would mean that a train of 16,383 pulses had been counted. However, since the first of these numbers is awkward to handle the arrangement shown in Fig. 7 may be employed. Here, a set of fifteen pairs of tubes is employed, arranged in five sets of three pairs each. Each such set of tubes represents the means for recording a single "digit" in a system using the digits 0 to 7, inclusive, so that 16,383 pulses counted would be recorded as the number 37,777.

As hereinbefore pointed out, if the three lower tubes 138, 139 and 140 are given the value zero each and the three upper tubes 141, 142 and 143 are given the value 1, 2 and 4, respectively, then the "digit" recorded on this unit will be equal to the sum of the values of the three tubes which are simultaneously inactive. A group of eight glow tubes 130 to 137, inclusive represented by the indicator circuit 11 of Fig. 1, is used to indicate the number recorded on this unit having the values 0 to 7, inclusive, respectively. Thus, if the three lower tubes 138, 139 and 140 are all inactive, as in normal condition, the glow tube 130 will be active and by glowing will indicate the "digit" zero. If, on the other hand, all three upper tubes 141, 142 and 143 are inactive, then glow tube 137 by glowing will indicate that the "digit" 7 (equal to the sum of 1+2+4) has been recorded.

It will be noted that each glow tube, such as the tube 130, is connected to a network having a resistance leading to one tube of each pair. Thus resistance 144 is connected to the anode of tube 138, resistance 145 is connected to the anode of tube 139 and resistance 146 is connected to the anode of tube 140. It is only when these three tubes 138, 139 and 140 are simultaneously inactive that the potential of the control electrode of glow tube 130 is sufficiently high to render the tube 130 active. From the above it will readily be seen that these tubes are connected in a network based on a permutation code whereby only one of the glow tubes 130 to 137 is rendered active at any one time.

The arrangement of the six tubes 138 to 143, inclusive, may be considered a recording and indicating means for the last "digit" in a system based on the use of digits 0 to 7, inclusive. Other digital recorders are indicated by the broken line rectangles to the right. All of the various pairs of tubes are arranged serially so that if the upper tube of each pair were given a value according to the simple binary geometric progression 1, 2, 4, 8, 16, 32, 64, 128, 256, 512, 1,024, 2,048, 4,096, 8,192, 16,384 and the upper tubes of the first fourteen pairs were active, then the sum of such values would be the sum of the first fourteen members of the above progression, of 16,383.

Appendix

By way of example, the following lists of values and types of resistances, capacities, voltages and tubes are given. It should be noted that other values may be used and it is quite possible that further experiment might prove that improvement in operation could be secured through deviation from the values and types given:

Resistors

| | |
|---|---|
| 16—5,000ω | 97—1Ω |
| 17—5,000ω | 99—125,000ω |
| 26—9,000ω | 100—1Ω |
| 27—5,000ω | 103—.1Ω |
| 32—5,000ω | 106—125,000ω |
| 34—.25Ω | 107—1Ω |
| 35—.5Ω | 109—125,000ω |
| 36—0-100,000ω | 110—1Ω |
| 37—150,000ω | 112—.5Ω |
| 42—100,000ω | 113—2Ω |
| 43—.5Ω | 120—50,000ω |
| 44—.5Ω | 121—100,000ω |
| 49—30,000ω | 122—50,000ω |
| 50—150,000ω | 127—5Ω |
| 51—100,000ω | 128—5Ω |
| 56—0-1Ω | 129—5Ω |
| 58—100,000ω | 150—125,000ω |
| 59—.5Ω | 151—1Ω |
| 60—.5Ω | 152—820ω |
| 65—50,000ω | 153—1,500ω |
| 66—.25Ω | 154—125,000ω |
| 67—.6Ω | 155—1Ω |
| 96—125,000ω | 156—820ω |

Condensers

| | |
|---|---|
| 13—1 mf. | 33—.002 mf. |
| 18—50 mf. | |

Condenser associated with grid of tube 41, 20 mf.

| | |
|---|---|
| 55—.5 mf. | 89—50 mmf. |
| 80—50 mmf. | 102—125 mmf. |
| 83—.03 mf. | 119—.1 mf. |
| 84—50 mmf. | |

Voltages

Figure 6:
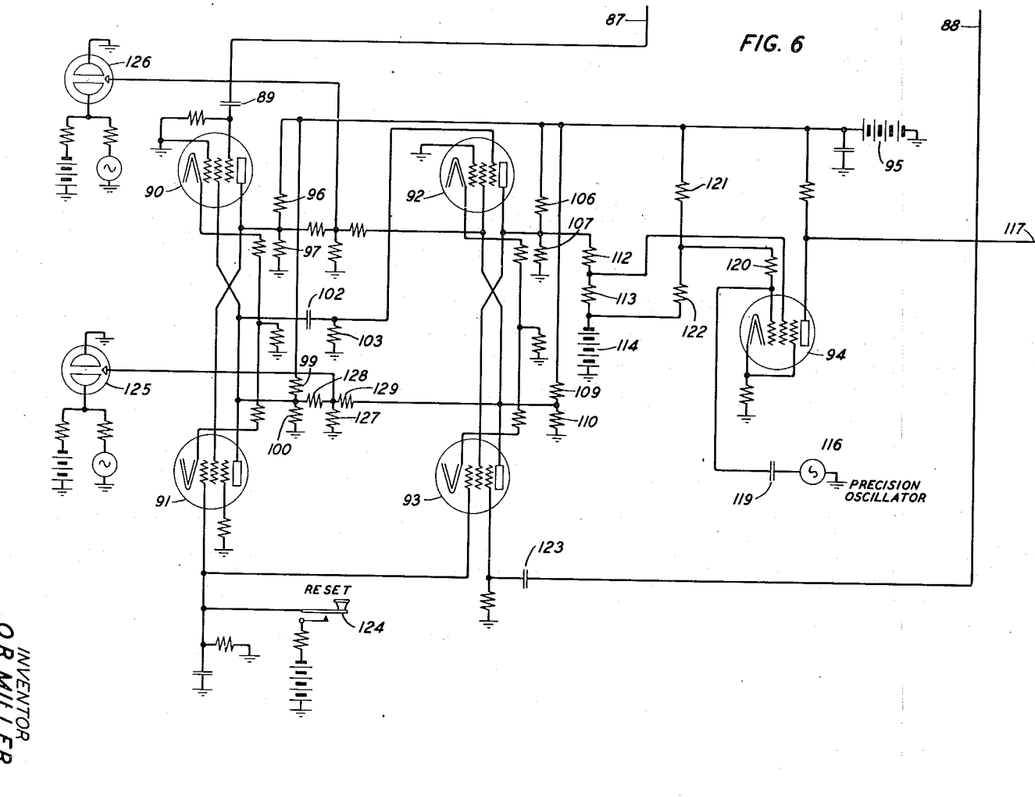
Fig. 6 is a circuit diagram of the gate circuit.

24—110 volts 60-cycle alternating current
Alternating current source to indicating lamps 71 and 72, 110 volts 60-cycle alternating current
38—+255 volts
39——150 volts
Fig. 5—direct current for anode potentiometers, +255 volts
Fig. 5—direct current for reset key 148, —150 volts
Fig. 6—95, +255 volts
Fig. 6—direct current for indicating lamps 125 and 126, —130 volts
Fig. 6—direct current for reset key 124, —150 volts
Fig. 6—114, —150 volts
Fig. 7—direct current for anode potentiometers, +255 volts
Fig. 7—direct current for reset key, —150 volts
Fig. 7—direct current for upper cathode of indicating lamps, —150 volts
Fig. 7—direct current for lower cathode of indicating lamps, +140 volts
Fig. 7—alternating current for lower cathode of indicating lamps, 110-volt 60-cycle alternating current

Tubes

| | |
|---|---|
| 15—6J5 | 90—6SJ7 |
| 30—884 | 91—6SJ7 |
| 31—6H6 | 92—6SJ7 |
| 41—884 | 93—6SJ7 |
| 46—½ 6F8 | 94—6SJ7 |
| 54—884 | 138—6SJ7 |
| 63—½ 6F8 | 139—6SJ7 |
| 81—6SJ7 | 140—6SJ7 |
| 82—6SJ7 | 141—6SJ7 |
| 85—6SJ7 | 142—6SJ7 |
| 86—6SJ7 | 143—6SJ7 |

What is claimed is:

1. Means for measuring the periodicity of a train of regularly recurring electrical impulses comprising a delay means for preventing the admission of impulses to the following measuring means for a predetermined time after the beginning of the operation, a means for counting a predetermined number of said impulses, said means generating and transmitting a start impulse marking the beginning and a stop impulse marking the ending of said counting operation, a source of impulses of known and accurate periodicity, a means for counting impulses from said source and means operated by said start and stop impulses for admitting impulses from said accurate source to said last counting means.

2. Means for measuring the periodicity of a train of regularly recurring electrical impulses comprising a delay means for preventing the admission of impulses to the following measuring means for a predetermined time after the beginning of the operation, a means for counting a predetermined number of said impulses, said means generating and transmitting a start impulse marking the beginning and a stop impulse marking the ending of said counting operation, said means also being responsive to impulses admitted thereto by said delay means for absorbing a predetermined number of said impulses before transmitting said start impulse, a source of impulses of known and accurate periodicity, a means for counting impulses from said source and means operated by said start and stop impulses for admitting impulses from said accurate source to said last counting means.

3. Means for measuring the frequency of an alternating current, comprising an impulse generator for translating said alternating current into a train of impulses of like periodicity, a delay means for preventing the admission of impulses to the following measuring means for a predetermined time after the beginning of the operation, a means for counting a predetermined number of said impulses, said means generating and transmitting a start impulse marking the beginning and a stop impulse marking the ending of said counting operation, a source of impulses of known and accurate periodicity, a means for counting impulses from said source and means operated by said start and stop impulses for admitting impulses from said accurate source to said last counting means.

4. The method of measuring the frequency of an alternating current which consists of delaying the admission of said alternating current to means for counting the cycles thereof for a predetermined time, absorbing without counting a predetermined number of said cycles after admission to said counting means, thereafter counting a predetermined number of cycles of said alternating current, marking the beginning and the ending of the said counting operation and simultaneously counting the number of cycles of alternating current from a known source of great accuracy which occur between the said beginning and ending of said first counting operation.

OHMER R. MILLER.